United States Patent [19]

Igra

[11] 4,132,499

[45] Jan. 2, 1979

[54] WIND DRIVEN ENERGY GENERATING DEVICE

[75] Inventor: Ozer Igra, New York, N.Y.

[73] Assignee: Ben Gurion University of the Negev, Beersheba, Israel

[21] Appl. No.: 762,277

[22] Filed: Jan. 25, 1977

[30] Foreign Application Priority Data

Jan. 29, 1976 [IL] Israel ........................................ 48928

[51] Int. Cl.[2] ................................................ F03D 17/00

[52] U.S. Cl. ........................................ 415/2; 415/116; 415/DIG. 1; 290/55; 60/269

[58] Field of Search ........................................ 415/2–4, 415/DIG. 1, 119, 116, 181; 60/269; 290/55

[56] References Cited

U.S. PATENT DOCUMENTS

| | | | |
|---|---|---|---|
| 3,123,285 | 3/1964 | Lee | 415/DIG. 1 |
| 4,021,135 | 5/1977 | Pedersen et al. | 415/2 |

FOREIGN PATENT DOCUMENTS

| | | | |
|---|---|---|---|
| 866053 | 6/1941 | France | 415/DIG. 1 |
| 891697 | 3/1944 | France | 415/DIG. 1 |
| 56102 | 9/1952 | France | 415/2 |
| 141488 | 3/1961 | U.S.S.R. | 415/DIG. 1 |

*Primary Examiner*—C. J. Husar
*Attorney, Agent, or Firm*—Donald M. Sandler

[57] ABSTRACT

A wind-driven energy-generating device comprises a shroud having a throat within which the rotor blades of a turbine are mounted, an intake section upstream of and having an inner face converging towards the throat, and a diffuser section downstream of and having an inner face diverging away from the throat. To prevent premature air separation along the inner surface of the diffuser section, the device includes boundary layer control means comprising a plurality of air channels leading from an external surface of the shroud to the internal surface of its diffuser section for injecting a flow of air of high kinetic energy from the air stream external of the shroud to the boundary layer of the air stream within the diffuser section of the shroud.

9 Claims, 4 Drawing Figures

FIG.1
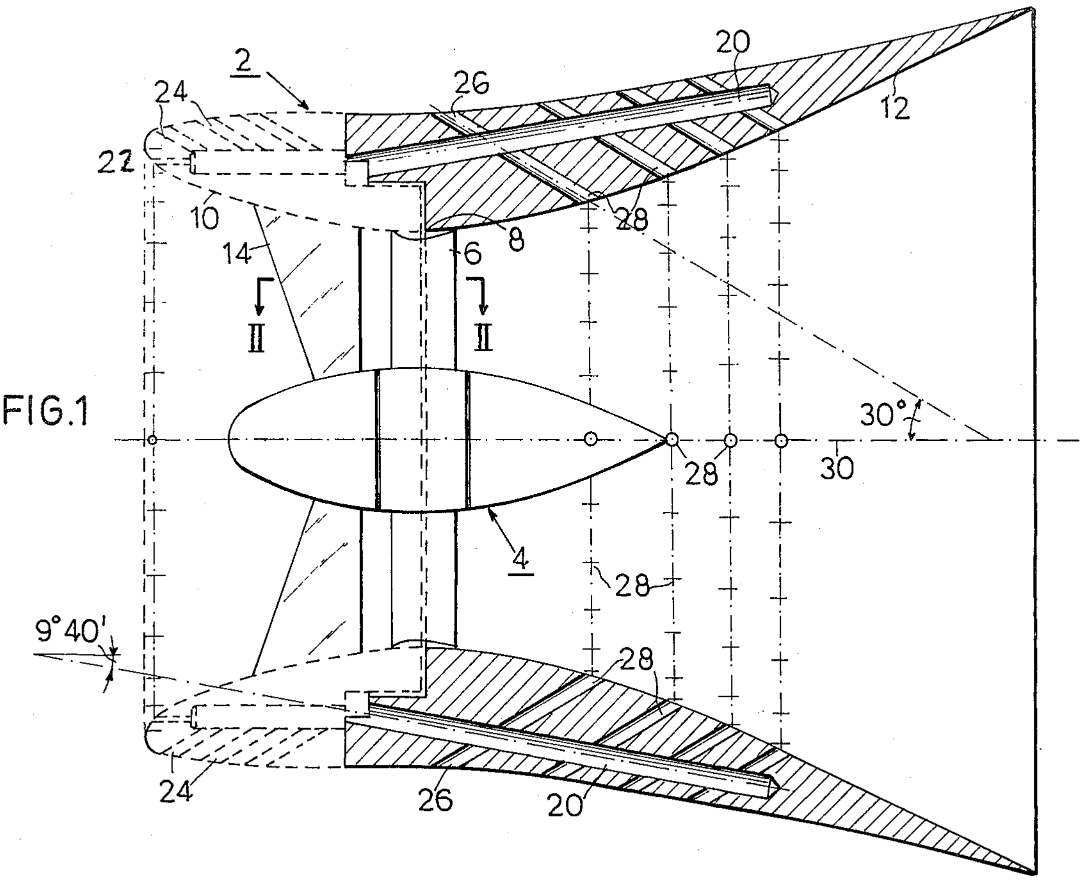
FIG.2
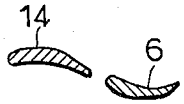
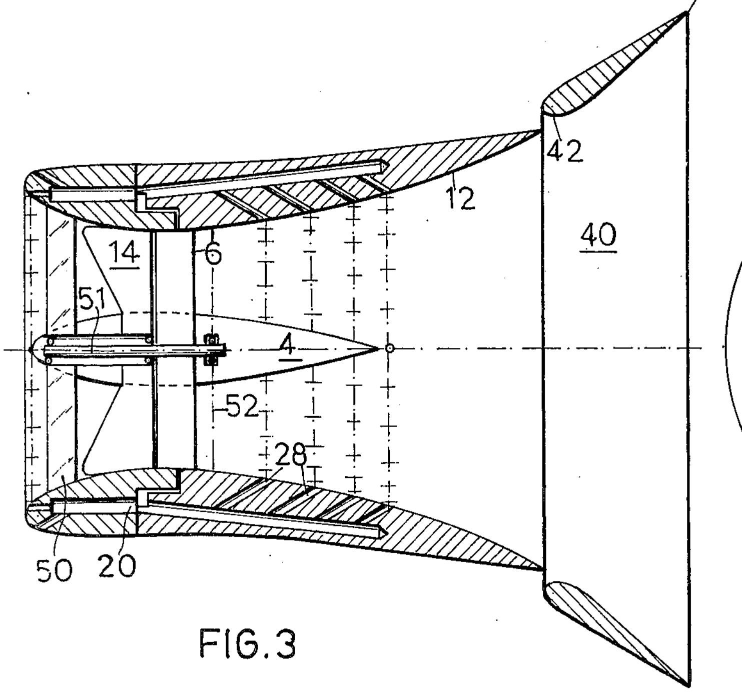
FIG.3
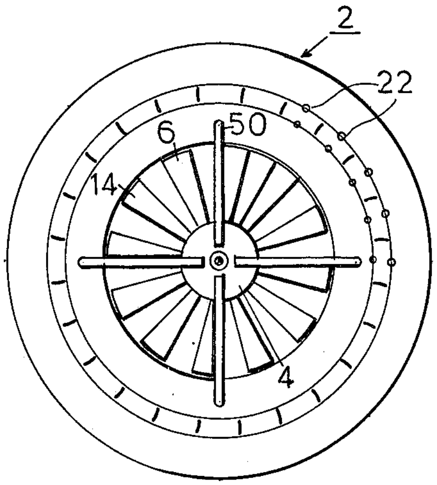
FIG.4

WIND DRIVEN ENERGY GENERATING DEVICE

BACKGROUND OF THE INVENTION

The present invention relates to a wind-driven energy-generating device of the type including a turbine having rotor blades driven by the wind. The invention is particularly useful with respect to aerogenerators for generating electrical power from the wind, and is therefore described below with respect to this application.

The many designs heretofore proposed for utilizing wind power for generating energy usually suffer from either low efficiency and/or high capital cost and therefore almost none have reached any significant commercial use. More recently, it has been proposed to utilize shrouds including a throat within which the wind-driven rotor blades are mounted for rotation, an intake section upstream of and converging towards the throat, and a diffuser section downstream of and diverging away from the throat. Such shrouds can increase the power output of a turbine by a factor of about 3, but they have the disadvantage of requiring a long length, particularly in its diffuser section. This is because the airstream experiences a drop in pressure below atmosphere as it leaves the turbine blades, and then a positive pressure gradient toward atmosphere as it is discharged from the exit end of the diffuser section. Thus, a continuous increase in pressure exists in the region of the diffuser section. This may cause separation of airflow from the wall of the diffuser, and as a result, a sharp lowering of performance. In order to avoid separation, the diffuser section was made of substantial length so as to have a relatively low total apex angle, in the order of 8.5 degrees.

SUMMARY OF THE INVENTION

An object of the present invention is to provide a wind-driven energy-generating device of the type including a shroud which device avoids premature separation of airflow in the diffuser section and therefore enables a significant reduction in its length.

According to the present invention, there is provided a wind-driven energy-generating device comprising a turbine including wind-driven rotor blades, and a shroud enclosing same. The shroud includes a throat within which the wind-driven rotor blades are mounted for rotation, an intake section upstream of and having an inner face converging towards the throat, a diffuser section downstream of and having an inner face diverging away from the throat, and boundary layer control means to prevent premature air separation along the inner surface of the diffuser section. The boundary layer control means includes a plurality of air channels formed through the shroud leading from an external surface of the shroud to the internal surface of its diffuser section for injecting a flow of air of high kinetic energy from the airstream external of the shroud to the boundary layer of the airstream within the diffuser section of the shroud.

According to a preferred feature of the invention, the air channels each include an inlet leading from an external surface of the shroud to an outlet exiting from the inner surface of the diffuser section of the shroud at an acute angle with respect to the longitudinal axis thereof.

According to another aspect of the invention, the air separation may be further reduced, thereby enabling a further reduction in the shroud length, by including a circular wing at the exit end of the shroud diffuser section and coaxial therewith, the circular wing having an inlet end of larger inner diameter than that of the exit end of the diffuser section, and an outlet end of larger inner diameter than that of its inlet end.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein:

FIG. 1 is a longitudinal sectional view of one form of aerogenerator constructed in accordance with the invention;

FIG. 2 is a section along lines II—II of FIG. 1 showing the configuration and arrangement of the stator and rotor blades;

FIG. 3 is a longitudinal sectional view of another form of aerogenerator constructed in accordance with the invention, this aerogenerator also including a circular wing; and FIG. 4 is an end elevational view of the aerogenerator of FIG. 3 with the circular wing removed.

DESCRIPTION OF THE PREFERRED EMBODIMENT

The aerogenerator illustrated in FIG. 1 comprises a shroud, generally designated 2, enclosing a central body or core 4, which may serve as the housing for the electrical generator of the turbine, the turbine having a plurality of wind-driven rotor blades 6. Blades 6 are disposed within the throat 8 of the shroud, the shroud also including an inlet section 10 upstream of and having an inner face converging towards the throat, and a diffuser section 12 downstream of and having an inner face diverging away from the throat. Housing 4 of the turbine is aerodynamically shaped, as shown, to maintain the orderly flow of the airstream within the shroud 2 and to minimize drag losses. The device may further include a plurality of stator blades 14 secured between housing 4 and shroud 10 for supporting the housing within the shroud and also for directing the airstream towards the rotor blades 6. The profiles of the stator blades 14 and rotor blades 6, and their relationship to each other, are illustrated in FIG. 2.

The aerogenerator illustrated in FIG. 1 further includes boundary layer control means to prevent premature air separation along the inner surface of the diffuser section 12. More particularly, the boundary layer control means includes a plurality of air channels leading from an external surface of the shroud to the internal surface of its diffuser section 12 for injecting a flow of air of high kinetic energy, from the airstream external of the shroud, to the boundary layer of the main airstream within the diffuser section of the shroud.

Thus, the shroud illustrated in FIG. 1 includes a plurality of air channels, generally designated 20, having one group of inlets 22 formed through the leading edge of the intake section 10 of the shroud, and another group of inlets 24 formed through the outer face of the intake section of the shroud adjacent to its leading edge. A further group of inlets 26 are provided through the diffuser section of the shroud. All the inlets communicate with channels 20, each channel communicating with a plurality of outlets 28 axially-spaced along the inner surface of the diffuser section. Thus, the outlets of all the air channels are disposed in the form of a plurality of annularly-arrayed, axially-spaced openings exiting from the inner surface of the shroud diffuser section 12. As indicated above, these air channels inject a flow of air of high kinetic energy from the airstream external of the shroud to the boundary layer of the airstream within the diffuser section 12 of the shroud, and thereby reduce or prevent separation which could cause a sharp lowering of aerogenerator performance.

Thus, by the provision of the boundary layer control air channels 20, the length of the shroud, particularly its diffuser section 12, may be substantially reduced without air separation.

The outlets 28 of the air channel 20 are disposed at an acute angle, preferably approximately 30 degrees, to the longitudinal axis 30 of the shroud. The channels may be formed by merely drilling holes through the shroud as required. By suitably locating the air channels, the high pressure air from the external flow may be directed to the spots where separation tend to start.

The density and disposition of the air channels may of course be varied according to any particular application. Preferably, the outlets 28 would be arranged substantially as illustrated, but the inlets may include only those corresponding to inlets 22 at the leading edge of the intake section 10, only those corresponding to inlets 24 formed through the outer face of the intake section adjacent to its leading edge, only those corresponding to inlets 26 formed through the outer face of the diffuser section of the shroud, or any desired combination of the above inlets.

FIGS. 3 and 4 illustrate another form of aerogenerator in accordance with the invention. The aerogenerator of FIGS. 3 and 4 is of similar construction as that described above with respect to FIGS. 1 and 2 (the corresponding parts being therefore identified by the same reference numerals), except that in the aerogenerator in FIGS. 3 and 4 there is provided a circular wing, generally designated 40, at the exit end of the shroud diffuser section 12. Circular wing 40 has an inlet end 42 of larger inner diameter than that of the exit end of the diffuser section 12, and an outlet end 44 of larger inner diameter than that of its inner end 42.

The use of the circular wing causes a significant drop in pressure at the exit end of the diffuser section 12, and thereby it further enables the length of the diffuser section to be shortened without separation.

As noted above, the air channels for injecting the air of high kinetic energy to the boundary layer of the airstream within the diffuser section of the shroud may be located as desired. FIGS. 3 and 4 illustrate substantially the same arrangement of air channels as in FIG. 1, except that they include only the inlets 22 through the leading edge of the inlet section, and one annular array of the inlets 24 through the outer face of the inlet section adjacent to its leading edge. They include none of the inlets 26 through the diffuser section 12. In addition, the aerogenerator includes a plurality of braces 50 providing a front support for the turbine shaft 51 connected to the rotor blades 6, and a plurality of braces 52 providing a rear support for the turbine shaft. In all other respects, the construction and operation of the aerogenerator of FIGS. 3 and 4 are substantially the same as described above with respect to FIG. 1.

Many variations, modifications and other applications of the illustrated embodiments will be apparent.

What is claimed is:

1. A wind-driven energy-generating device comprising: a turbine including wind-driven rotor blades; and a shroud enclosing same; said shroud including a throat within which the wind-driven rotor blades are mounted for rotation, an intake section upstream of and having an inner face converging towards the throat, a diffuser section downstream of and having an inner face diverging away from the throat, and boundary layer control means to prevent premature air separation along the inner surface of the diffuser section; said boundary layer control means including a plurality of air channels formed through the shroud leading from an external surface of the shroud to the internal surface of its diffuser section for injecting a flow of air of high kinetic energy from the airstream external of the shroud to the boundary layer of the airstream within the diffuser section of the shroud.

2. A device according to claim 1, wherein said air channels each includes an inlet leading from an external surface of the shroud to an outlet exiting from the inner surface of the diffuser section of the shroud at an acute angle with respect to the longitudinal axis thereof.

3. A device according to claim 2, wherein said acute angle is approximately 30°.

4. A device according to claim 2, wherein said outlets are in the form of a plurality of annularly-arrayed axially-spaced openings in the inner surface of the shroud diffuser section.

5. A device according to claim 2, wherein said air channel inlets are formed through the leading edge of the intake section of the shroud.

6. A device according to claim 2, wherein said air channel inlets are formed through the outer face of the intake section of the shroud adjacent to its leading edge.

7. A device according to claim 1, further including a circular wing at the exit end of the shroud diffuser section and coaxial therewith, the circular wing having an inlet end of larger inner diameter than that of the exit end of the diffuser section, and an outlet end of larger inner diameter than that of its inlet end.

8. A device according to claim 1, further including an aerodynamically-shaped central core fixed within the shroud in the region of its throat and its junctions to the intake and diffuser sections.

9. A device according to claim 8, further including stator blades between the central core and the intake section of the shroud at the upstream side of the wind-driven rotor blades.

* * * * *